United States Patent [19]

Stevens et al.

[11] Patent Number: 5,701,404
[45] Date of Patent: Dec. 23, 1997

[54] METHOD AND SYSTEM FOR EFFICIENTLY TRIMMING A NURBS SURFACE WITH A PROJECTED CURVE

[75] Inventors: Marc P. Stevens, La Prairie, Canada; Alan Crawford, Salt Lake City, Utah

[73] Assignee: Softimage, Montreal, Canada

[21] Appl. No.: 658,951

[22] Filed: May 31, 1996

Related U.S. Application Data

[60] Provisional application No. 60/015,277.
[51] Int. Cl.$^6$ .................................................. G06T 15/30
[52] U.S. Cl. ........................... 395/123; 395/134; 395/142
[58] Field of Search ..................................... 395/119, 123, 395/124, 141, 142, 134; 345/139

[56] References Cited

U.S. PATENT DOCUMENTS

| | | | |
|---|---|---|---|
| 4,879,668 | 11/1989 | Cline et al. | 395/124 |
| 4,882,679 | 11/1989 | Tuy et al. | 345/139 |
| 5,353,389 | 10/1994 | Fiasconaro | 395/119 |
| 5,363,478 | 11/1994 | Fiasconaro | 395/141 |
| 5,377,320 | 12/1994 | Abi-Ezzi et al. | 395/119 X |

OTHER PUBLICATIONS

Pegna et al. "Designing and Mapping Trimming Curves on Surfaces using Orthogonal Projection", Advances in Design Automation 1990, vol. 23, part 1, pp. 235–245, 1990.

Faroiki, "Trimmed–surface Algorithms for the Evaluation and Interrogation of Solid Boundary Representations", IBM J. Res. Develop., vol. 31, No. 3, pp. 314–334, May. 1987.

*Primary Examiner*—Mark K. Zimmerman
*Attorney, Agent, or Firm*—Ronald M. Anderson

[57] ABSTRACT

A curve projected onto a NURBS surface defines trim regions on the NURBS surface. A plurality of spaced-apart points are defined on the curve and rays are project through the points toward a NURBS surface. Any intersections of the rays with the NURBS surface is mapped into the U,V domain. Corresponding points of adjacent rays are connected to define at least a portion of each trim region on the NURBS surface. Transitions on the NURBS surface between adjacent rays are detected based upon differences in the number of intersections of adjacent rays. The location of each transition is determined to within a selected tolerance by using a binary subdivision of the interval between adjacent rays. The location of such transitions is used to determine how intersections of the rays with the surface at the boundaries of the NURBS surface should be connected. Parity assigned to the rays at each intersection determines the direction in which intersections along the rays are connected. The technique enables real-time trimming of the NURBS surface to be carried out in response to any change to the curve and/or NURBS surface topology.

21 Claims, 12 Drawing Sheets

METHOD AND SYSTEM FOR EFFICIENTLY TRIMMING A NURBS SURFACE WITH A PROJECTED CURVE

This is a continuation-in-part application based on a provisional application, Ser. No. 60/015,277, which was filed on Apr. 12, 1996, the benefit of the filing date of which is hereby claimed under 35 U.S.C. § 120.

FIELD OF THE INVENTION

This invention generally relates to a method and system used to project a three-dimensional (3D) curve through a non-uniform rational b-spline (NURBS) surface, and more specifically, for defining trim regions on the NURBS surface where the projected curve intersects the surface.

BACKGROUND OF THE INVENTION

In an ideal interactive 3D modeling environment, the user would prefer to edit the shapes of elements comprising an image and immediately see the result displayed on a monitor. One area of interactive modeling in which this objective is typically not achieved is the determination of trim regions on a NURBS surface in response to changes in the shape of the surface, its orientation, or changes to an element such as a curve that is projected through the surface to define the trim regions. The word "trim" is commonly used in computer graphics as a verb applied to the process of defining boundaries and holes in the domain of a parametric surface, i.e., a NURBS surface, and as an adjective applied to any region comprising the boundaries and holes in the NURBS surface that are thus defined.

The prior art typically employs one of three different approaches for defining trim regions on NURBS surfaces. The first approach relies upon surface/surface intersections. Given two NURBS surfaces, the places where the two surfaces intersect define the trim regions for the surfaces. A primary disadvantage of this method is that it can take several minutes to compute on even a relatively powerful computer system, for even the simplest models. A computationally time consuming approach such as this technique is unacceptable during an interactive editing operation in which any change to one of the NURBS surfaces will required that the entire topology of the model again be evaluated to determine any changes in the trim regions.

The second approach defines trim regions directly in a U,V domain of the surface. While this method is sufficiently fast to be used during an interactive editing session, it yields an indirect result. The user is forced to work in a space defined by the mathematics of parametric surfaces instead of with the actual 3D surface being constructed. A 3D curve can be defined by three continuous functions of a single parameter, t, as follows:

$$x=f(t),\ y=g(t),\ z=h(t) \qquad (1)$$

If t is interpreted as time, the above equations defining the path of a moving point on the 3D curve. However, the curve on a 3D NURBS surface curve is a configuration of points having a two-dimensional character, i.e., a point moving on a surface with two degrees of freedom, but otherwise unrestricted. The point may pass through the same position in space several times, and in this case, the curve will intersect itself. Thus, an ordered configuration of point that define the curve on a 3D NURBS surface is readily represented in U,V space by three continuous functions, with two parameters, as follows:

$$x=f(u,v),\ y=g(u,v),\ z=h(u,v) \qquad (2)$$

Subsequently, the intersection of rays with a NURBS surface can be parametrically represented in the U,V domain, but interactive manipulation of curves in this mathematical domain is not very intuitive.

Other methods use a projection of a curve onto the surface, but do not consider the topological implications. Specifically, a projected 3D curve can define one or more distinct curves on the target NURBS surface. In addition, if a projected curve is undersampled, critical information about transitions in the NURBS surface will be lost and there will be no hope of determining the correct trim regions on the target NURBS surface. These two problems arise in projection methods that do an extrusion of the curve in the projection direction, followed by a surface-to-surface intersection as described in connections with the first prior art approach. Accordingly, the projection approach used in the prior art suffers from the same time consuming computational overhead of the first approach discussed above.

From the preceding discussion, it will be apparent that an improved technique is needed to enable trim regions to be defined during an interactive editing session. The technique should be sufficiently efficient so that it can be implemented in real time without significant time being required to compute the trim region when editing changes to the NURBS surface and/or the 3D curve defining the trim region are made by the user.

SUMMARY OF THE INVENTION

In accord with the present invention, a method for defining a trim region on a 3D representation of a surface, as a function of a curve, comprises the step of defining a plurality of spaced-apart sample points along the curve. Rays are projected from the plurality of points, generally in a direction toward the surface, so that at least some of the rays intersect the surface at points of intersection. Each intersection of the surface is mapped into a U,V parametric domain. The number of the points of intersection of each ray with the surface are then determined. If the number of points of intersection on adjacent rays are equal, corresponding points of intersection of the adjacent rays on the surface are connected to define at least a portion of a trim region. A transition of the surface that is disposed between two adjacent rays is detected, based upon a difference in the number of the points of intersection of the adjacent rays. The transition indicates a location where the rays enter or leave a portion of the surface, thereby defining a remaining portion of the trim region.

The step of detecting a transition of the surface preferably includes the step of determining a location of the transition to within a defined tolerance. A binary subdivision process is used to determine the location of the transition to within the defined tolerance. This process includes the steps of projecting new rays successively from the curve that are disposed between the adjacent rays. An interval between successive new rays is subdivided into increasingly smaller intervals, until the location of the transition is determined to be within a subdivided interval that is substantially equal to the defined tolerance.

The method also preferably provides for dividing the surface into a plurality of adjacent patches. A bounding box hierarchy of the surface is then created in which a lowest level of the hierarchy comprises each individual patch. A predefined plurality of the patches are grouped to form a box on a next higher level of the hierarchy. Subsequent levels in the hierarchy are created by repetitively grouping a predefined number of the boxes on a current level of the hierarchy, until the grouping process yields a single box that fully encompasses the surface on a highest level of the hierarchy. A ray projected from the curve intersects the surface if the ray intersects the box at the highest level of the hierarchy. If a ray intersects the surface, a location for the intersection of the ray with the surface is determined by checking the boxes in successively lower levels of the hierarchy for a box that is intersected, until a patch on the curve that is intersected is identified at the lowest level of the hierarchy.

The steps of connecting the points of intersection on the surface preferably comprise the step of defining either a closed loop or a segment. The method also preferably includes the step of ordering the rays and the points of intersection of the rays with the surface along each ray as it is projected from the curve.

A direction in which to connect points of intersection of adjacent rays is determined as a function of a parity parameter associated with the points of intersection. Each successive point of intersection along a ray exhibits a change in the parity parameter.

At each transition, points of intersection on adjacent rays are selected for connection to each other based on a shortest 3D distance between the intersection points on adjacent successive rays that determine the location of the transition within the defined tolerance. Any remaining unconnected points of intersection on one of the adjacent rays having the greater number of such points are connected to the next unconnected points of intersection on that ray.

An orientation is determined for a set of the connected points of intersection that represent one of two types of curves, including holes and segments on the surface. However, the orientation of the set of the connected points of intersection is reversed, if the orientation thereof differs from that predefined for the type of curve represented by the set of connected points of intersection.

In some cases it will be necessary to resolve any overlaps between trim regions defined by the curve on the surface and those defined by another curve.

A polynomial function is preferably fitted to the points of intersection that are connected together. The polynomial function smoothly defines the trim region.

Another aspect of the present invention is directed to a system for determining trim regions on a surface, defined by a curve. The system includes a memory for storing a plurality of machine instructions. A processor executes the machine instructions to implement a plurality of functions that are generally consistent with the steps of the method defined above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 18:
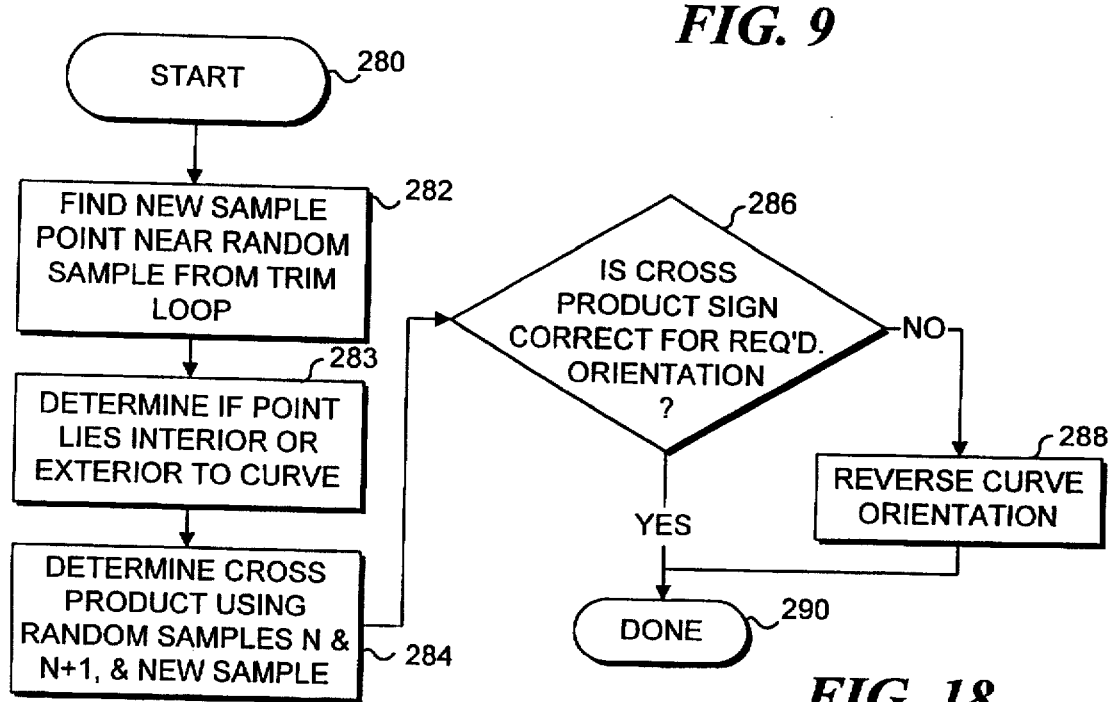
Figure 11A:
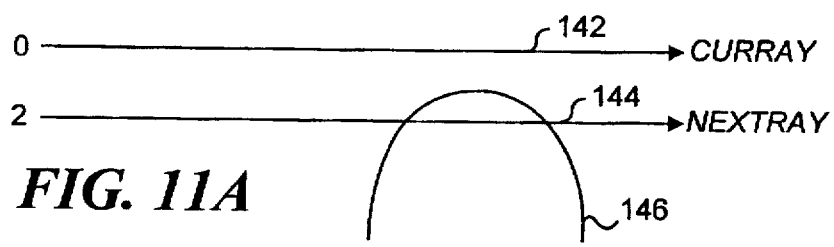
Figure 11B:
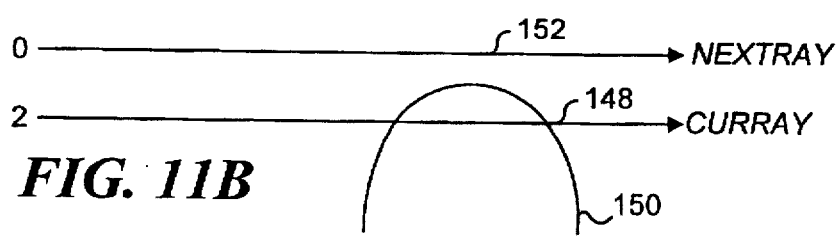
Figure 11C:
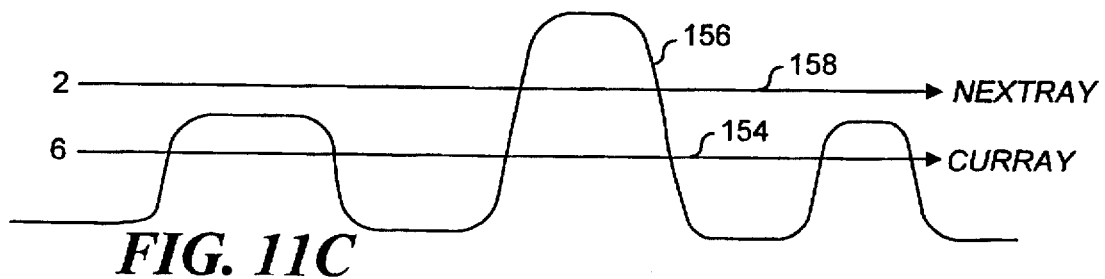
Figure 12A:
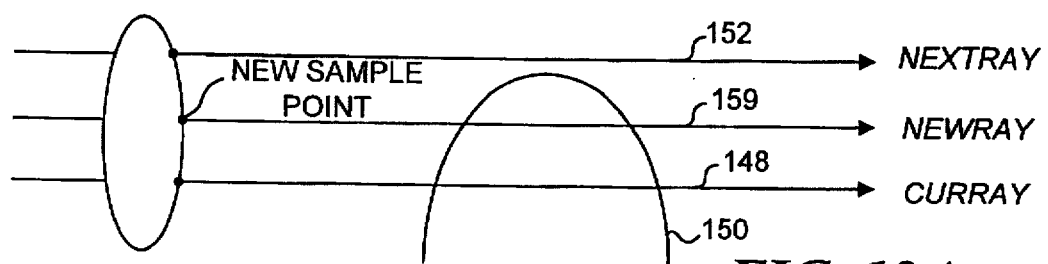
Figure 12B:
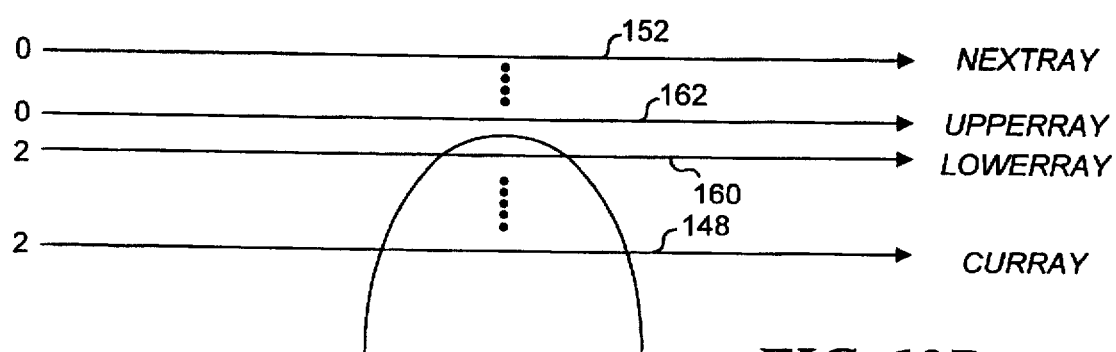
Figure 12C:
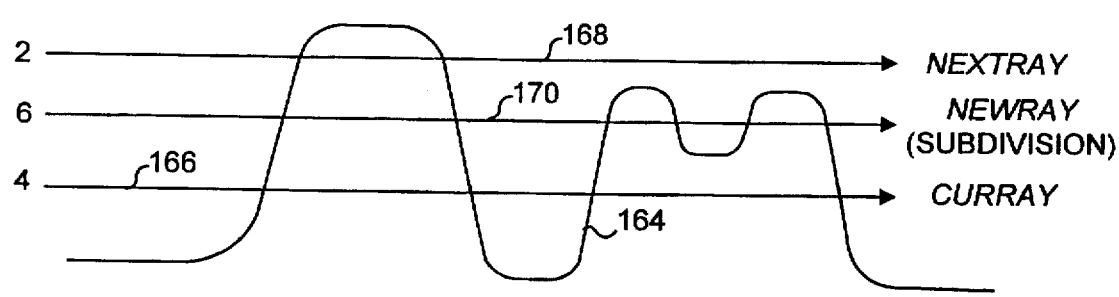
Figure 13:
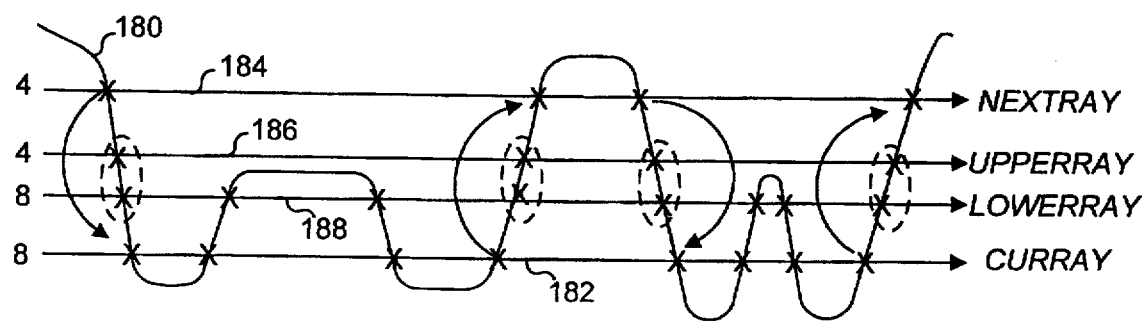
Figure 14:
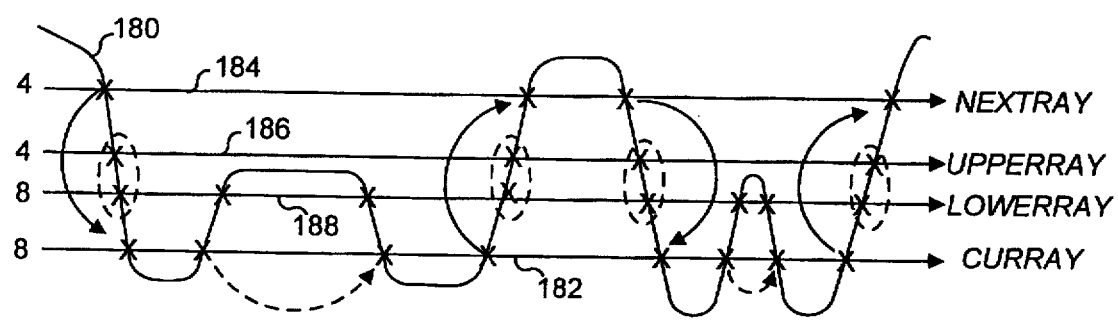
Figure 15A:
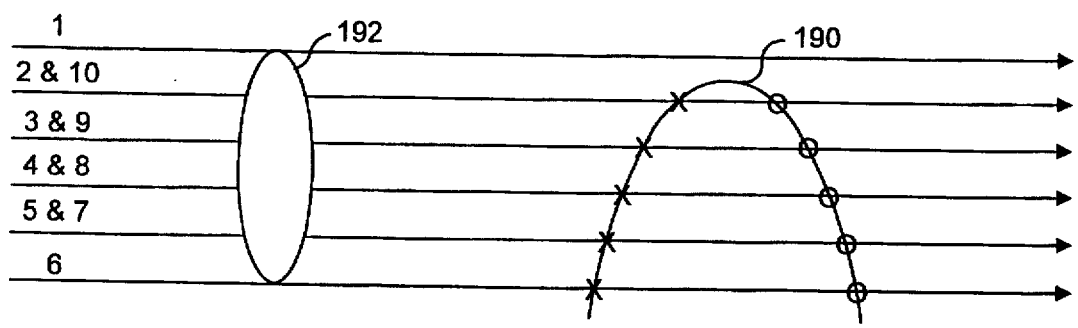
Figure 15B:
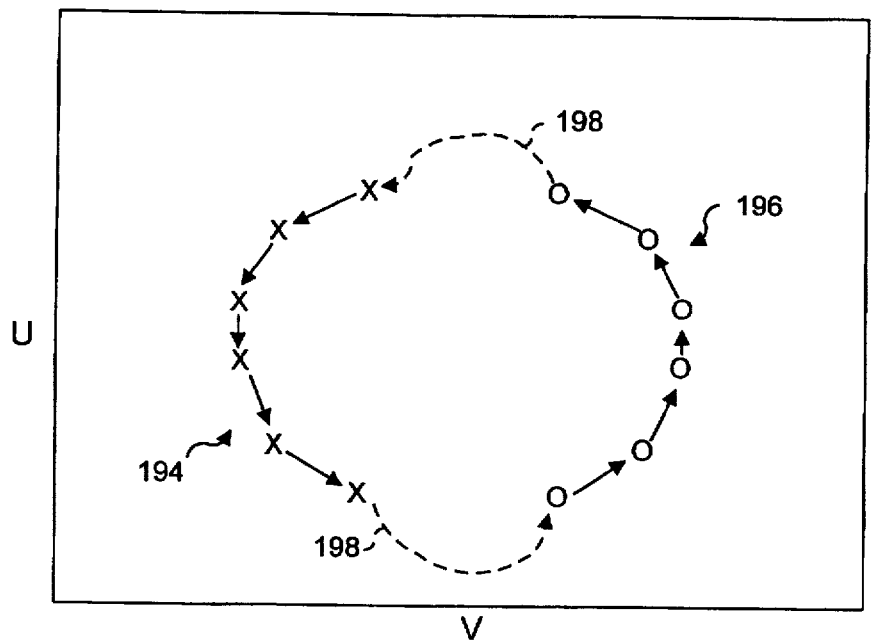
Figure 16:
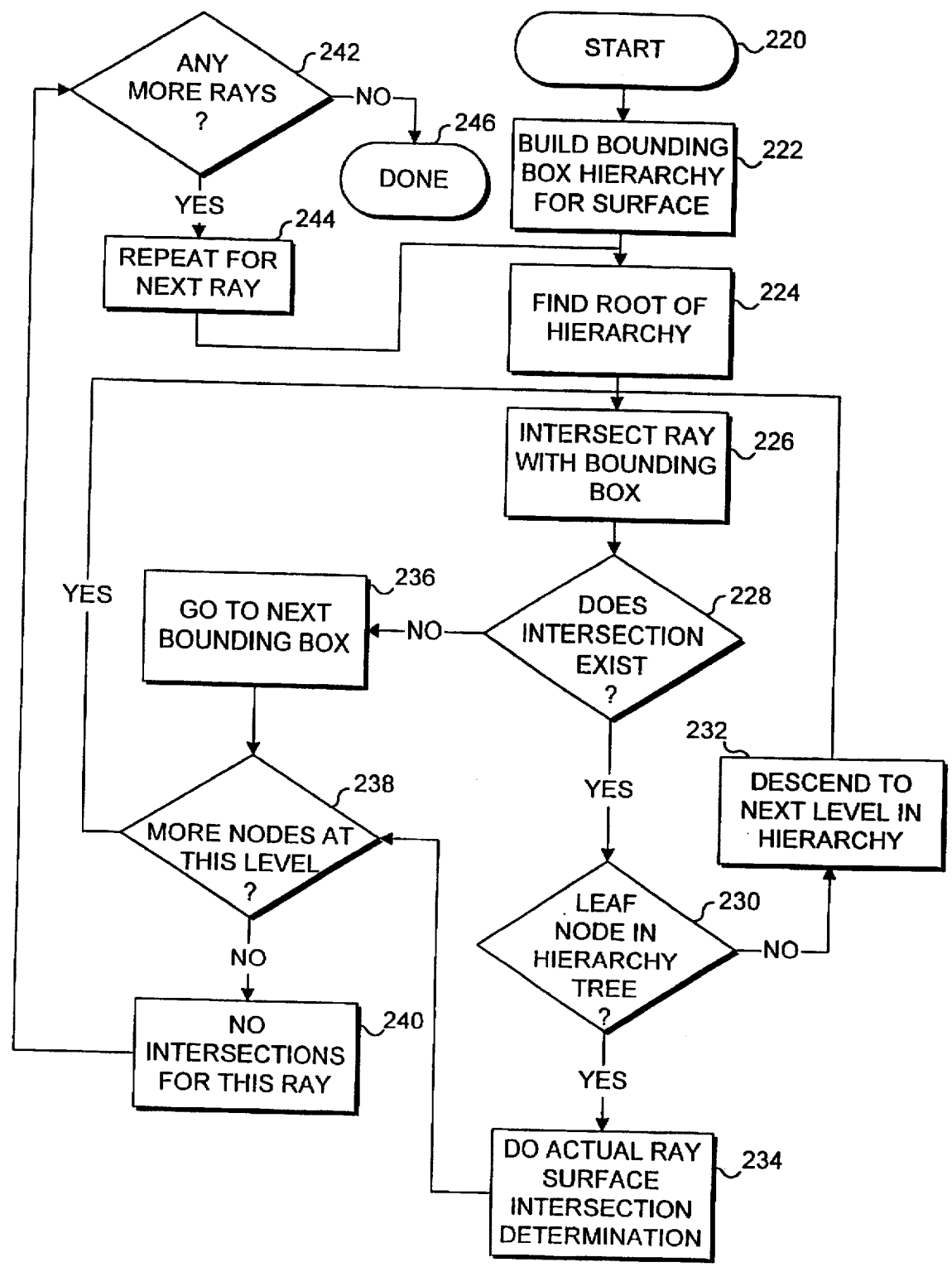
Figure 17:
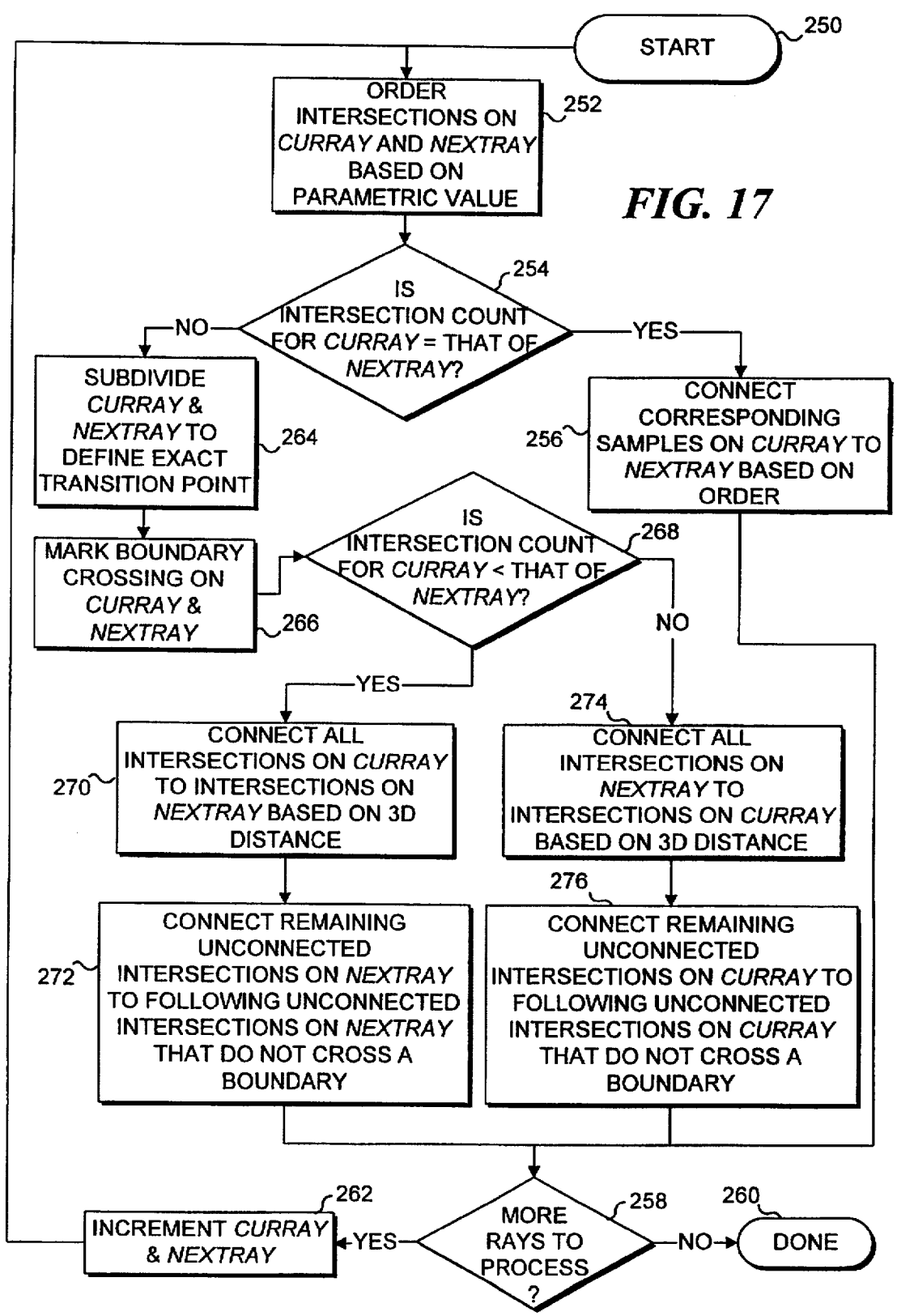
Figure 19:
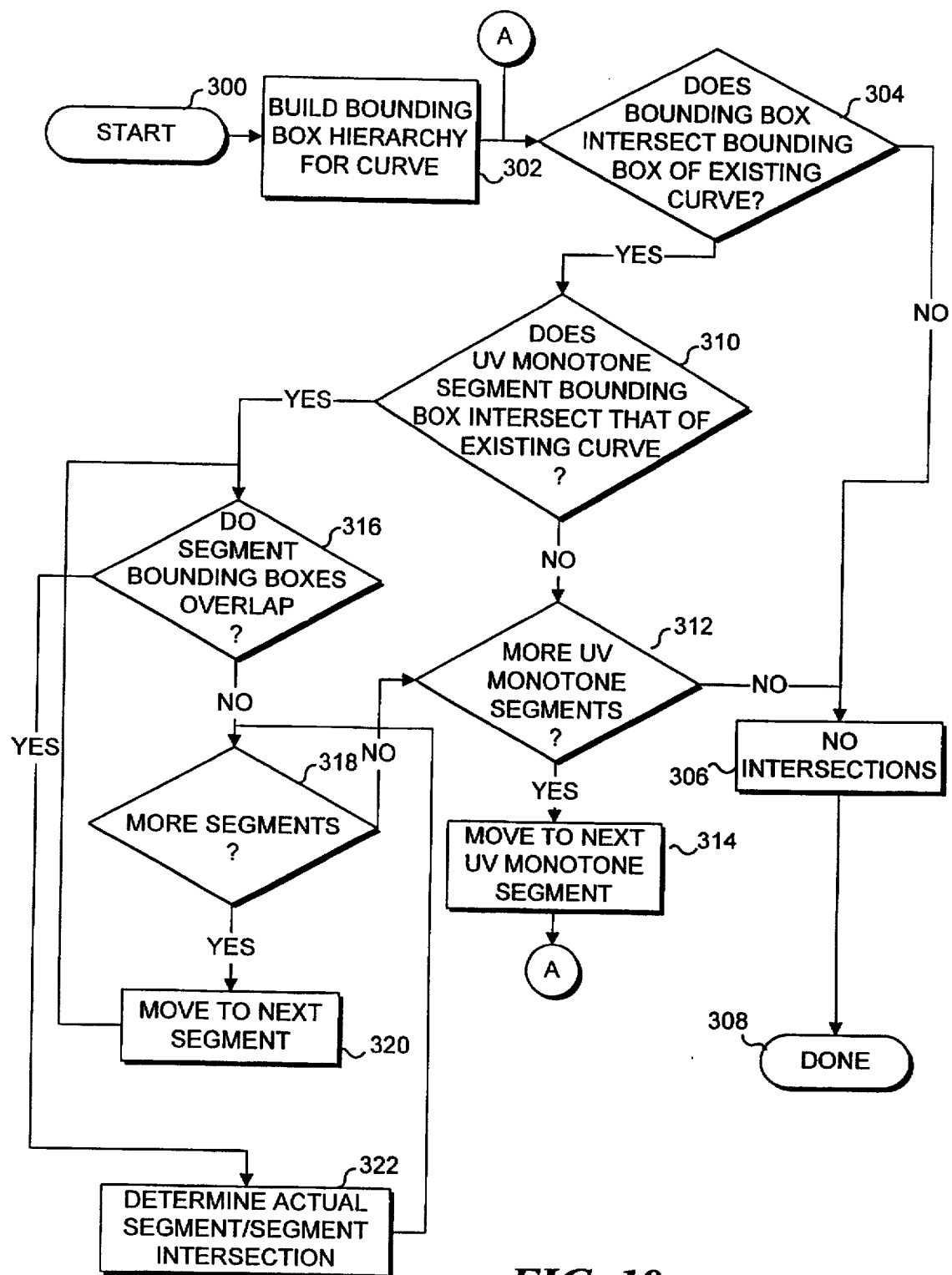

FIGS. 11A, 11B, and 11C respectively illustrate transitions for successive rays crossing a surface boundary, leaving a surface bound, and striking less of the surface;

FIG. 12A illustrates a first step in a binary subdivision process to determine a topology of a surface being trimmed;

FIG. 12B illustrates further steps in the binary subdivision process to determine the topology of the surface;

FIG. 12C illustrates yet another step in the binary subdivision process to determine the topology of the surface;

FIG. 13 illustrates the intersections of rays with a NURBS surface and the links between successive rays;

FIG. 14 extends the process for trimming the NURBS surface of FIG. 13, showing connections between the remaining intersections along a current ray;

FIG. 15A illustrates a plurality of rays, indicating the transitions in and out of a NURBS surface, and individual curve segments that are connected at a transition;

FIG. 15B illustrates the connections for FIG. 15A in the U,V domain;

FIG. 16 is a flow chart showing the steps for using a bounding box hierarchy to reduce the complexity of the process used to determine the trim regions;

FIG. 17 is a flow chart showing the logic steps implemented in linking intersections with the NURBS surface on the rays projected from the curve;

FIG. 18 is a flow chart showing steps for determining the curve orientation; and FIG. 19 is a flow chart illustrating the logic employed to handle possible curve/curve intersections when multiple curves are projected onto a NURBS surface.

DESCRIPTION OF THE PREFERRED EMBODIMENT

Figure 1:
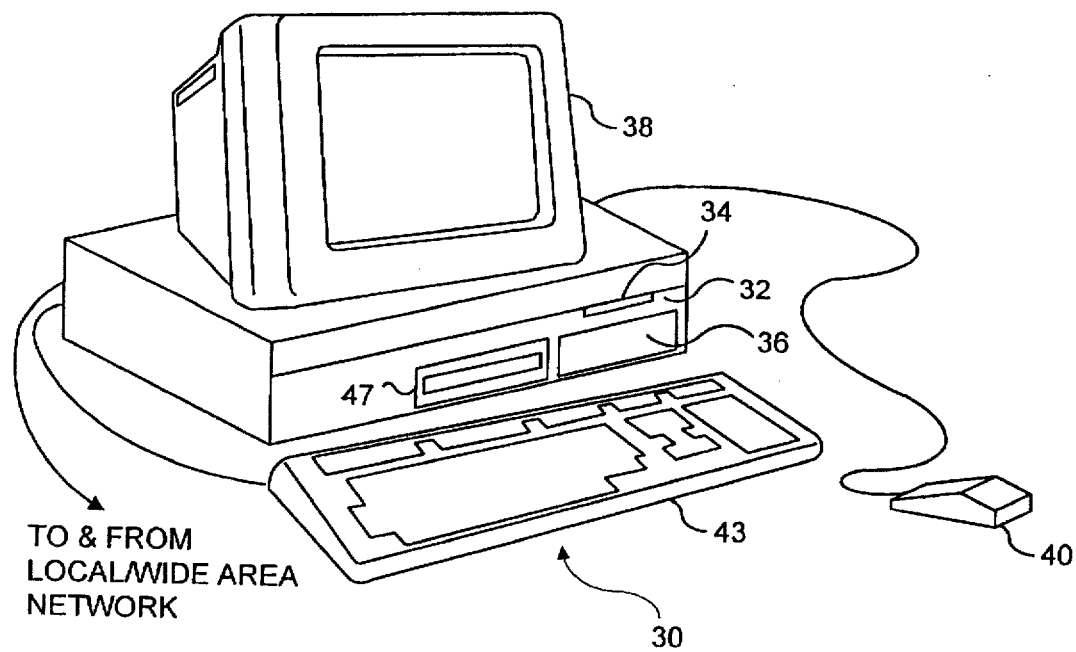
FIG. 1 is an isometric view of a conventional personal computer system suitable for executing software that implements the present invention.

With reference to FIG. 1, a generally conventional personal computer 30 is illustrated, which is suitable for use in connection with practicing the present invention. Alternatively, a workstation may be instead be used. Personal computer 30 includes a processor chassis 32 in which are mounted a floppy disk drive 34, a hard drive 36, a motherboard populated with appropriate integrated circuits (not shown), and a power supply (also not shown), as are generally well known to those of ordinary skill in the art. A monitor 38 is included for displaying graphics and text generated by software programs that are run by the personal computer. A mouse 40 (or other pointing device) is connected to a serial port (or to a bus port) on the rear of processor chassis 32, and signals from mouse 40 are conveyed to the motherboard to control a cursor on the display and to select text, menu options, and graphic components displayed on monitor 38 by software programs executing on the personal computer. In addition, a keyboard 43 is coupled to the motherboard for user entry of text and commands that affect the running of software programs executing on the personal computer.

Personal computer 30 also optionally includes a compact disk-read only memory (CD-ROM) drive 47 into which a CD-ROM disk may be inserted so that executable files and data on the disk can be read for transfer into the memory and/or into storage on hard drive 36 of personal computer 30.

Figure 2:
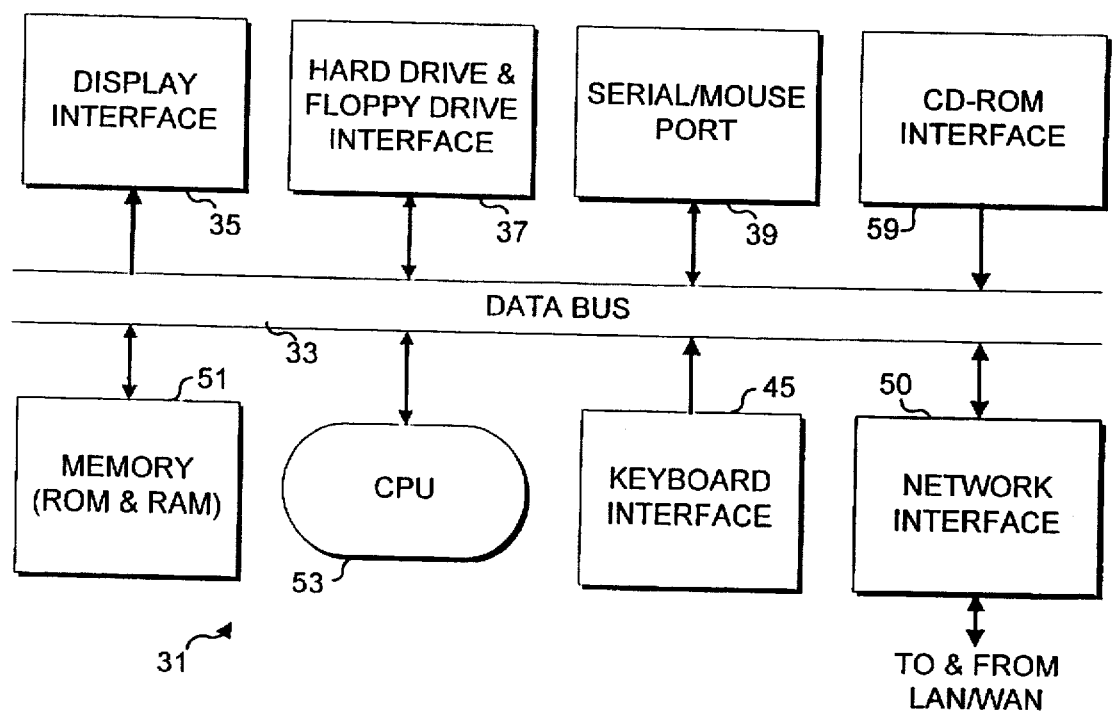
FIG. 2 is a schematic block diagram of components included within a processor chassis of the personal computer.

Although details relating to all of the components mounted on the motherboard or otherwise installed inside processor chassis 32 are not illustrated, FIG. 2 is a block diagram illustrating some of the functional components that are included. The motherboard includes a data bus 33 to which these functional components are electrically connected. A display interface 35, comprising a video graphics accelerator card, for example, generates signals in response to instructions executed by a CPU 53 that are transmitted to monitor 38 so that graphics and text are displayed on the monitor. It should be noted that CPU 53 may represent only one of a plurality of CPUs that operate in parallel within the processor chassis to execute software programs. A hard drive and floppy drive interface 37 is coupled to data bus 33 to enable bidirectional flow of data and instructions between data bus 33 and floppy drive 34 or hard drive 36. Software programs executed by CPU 53 are typically stored on either hard drive 36, or on a floppy disk (not shown) that is inserted into floppy drive 34. The software program comprising the present invention will likely be distributed either on such a floppy disk, on-line via the modem, or on a CD-ROM disk, and will likely be stored on hard drive 36 for execution by CPU 53.

A serial/mouse port 39 (representative of the two serial ports typically provided) is also bidirectionally coupled to data bus 33, enabling signals developed by mouse 40 to be conveyed through the data bus to CPU 53. Alternatively, if a different device such as an external modem (not shown) is coupled to the serial port, data can be transmitted bidirectionally from the CPU to the modem. A CD-ROM interface 59 connects CD-ROM drive 47 to data bus 33. The CD-ROM interface may be a small computer systems interface (SCSI) type interface or other interface appropriate for connection to and operation of CD-ROM drive 47.

A keyboard interface 45 receives signals from keyboard 43, coupling the signals to data bus 33 for transmission to CPU 53. Also coupled to data bus 33 is a network interface 50 (which may comprise an Ethernet card for coupling the personal computer to a local area and/or wide area network). Data used in connection with the present invention may be stored on a server and transferred to personal computer 30 over the network to carryout the functions described below.

When a software program is selected by a user to be executed by CPU 53, the machine instructions comprising the program that are stored on a floppy disk, a CD-ROM, or on hard drive 36 are transferred into a memory 51 via data bus 33. Machine instructions comprising the software program are executed by CPU 53, causing it to implement functions determined by the machine instructions. Memory 51 includes both a nonvolatile read only memory (ROM) in which machine instructions used for booting up personal computer 30 are stored, and a random access memory (RAM) in which machine instructions and data are temporarily stored when executing application programs. The present invention will be included in a 3D rendering and graphics program to be distributed by SoftImage Corporation. Due to the size of the files comprising this software, it will preferably be distributed on CD-ROM, but may alternatively be distributed on floppy disks.

Figure 3A:
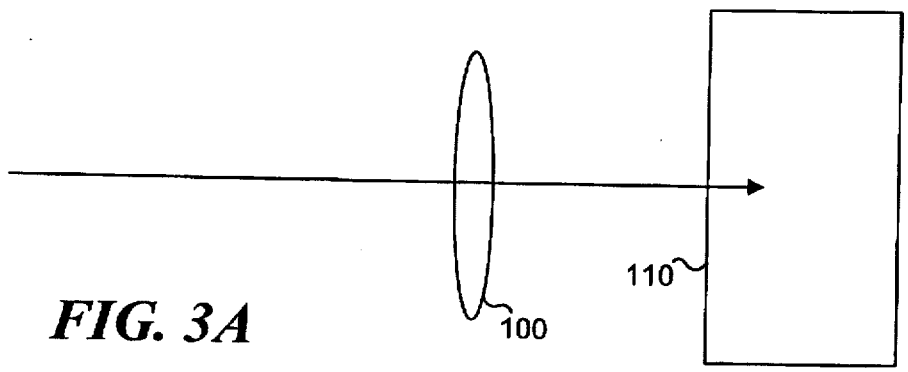
FIG. 3A illustrates the projection of a circle onto a surface.

In the present method, a NURBS surface is trimmed by projecting closed 3D curves into the domain of the surface to define trim regions, as shown by the example in FIG. 3A, in which a circle 100 is projected onto a surface 110. The projection can be in a direction normal to the curve or at any other selected angle, or the rays are projected from a single point through the spaced-apart points on the curve to achieve a perspective projection of the curve onto the NURBS surface. The type of projection and the direction of the projection is specified by a user of the procedure described below.

Figure 3B:
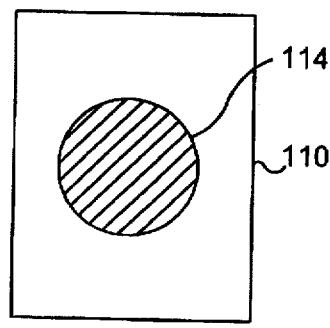
FIGS. 3B and 3C are an elevational view of the surface showing the remaining portion of the surface after it is trimmed by projecting the circle onto it.
Figure 3C:
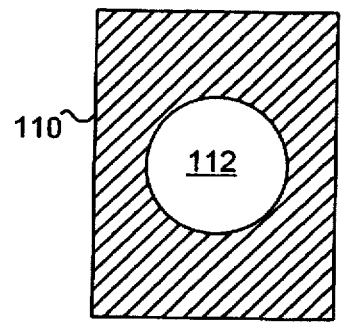
Figure 4:
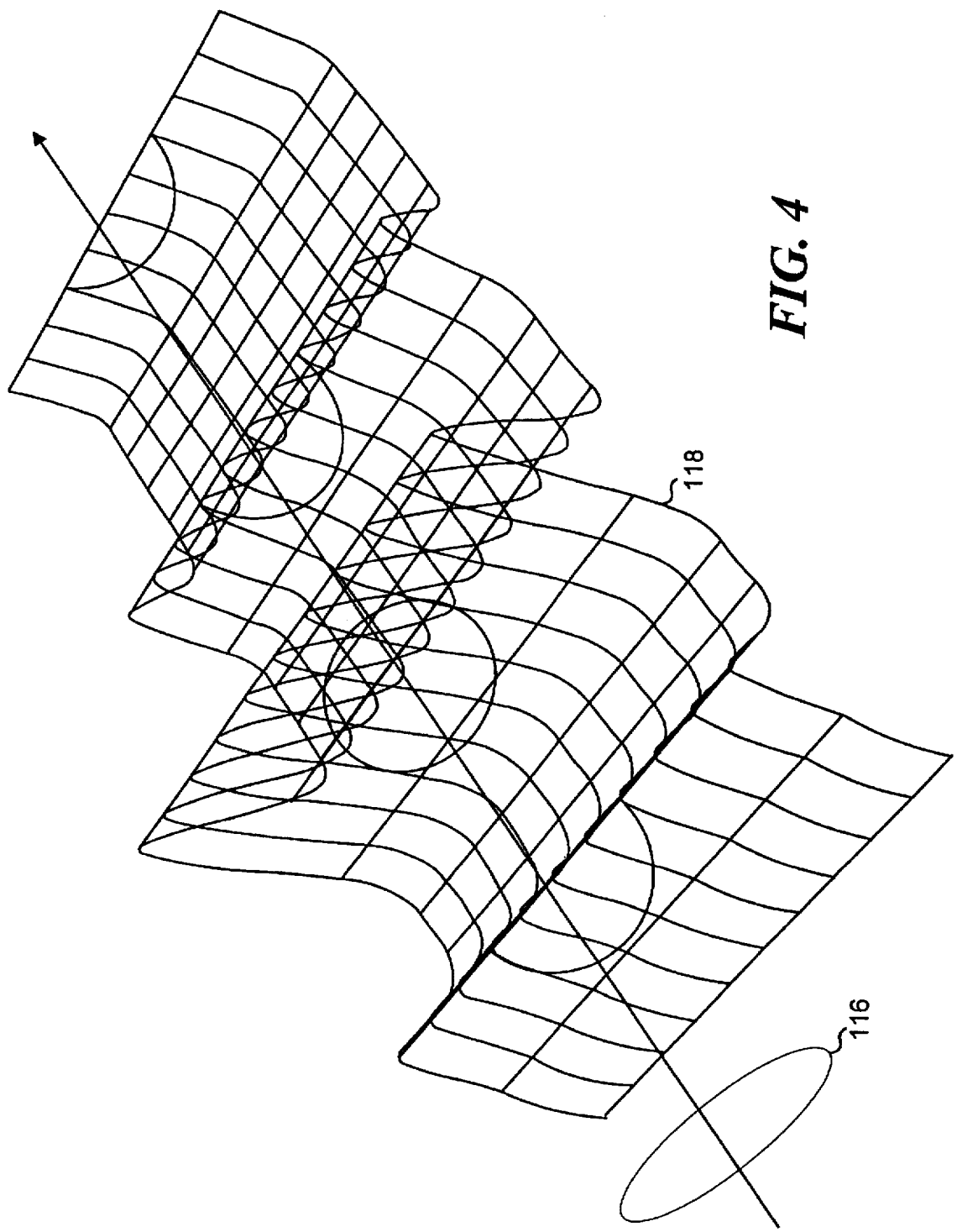
FIG. 4 is an isometric wire frame view of a NURBS surface showing boundaries defining trim regions that are determined by projecting a circle onto the NURBS surface.
Figure 5:
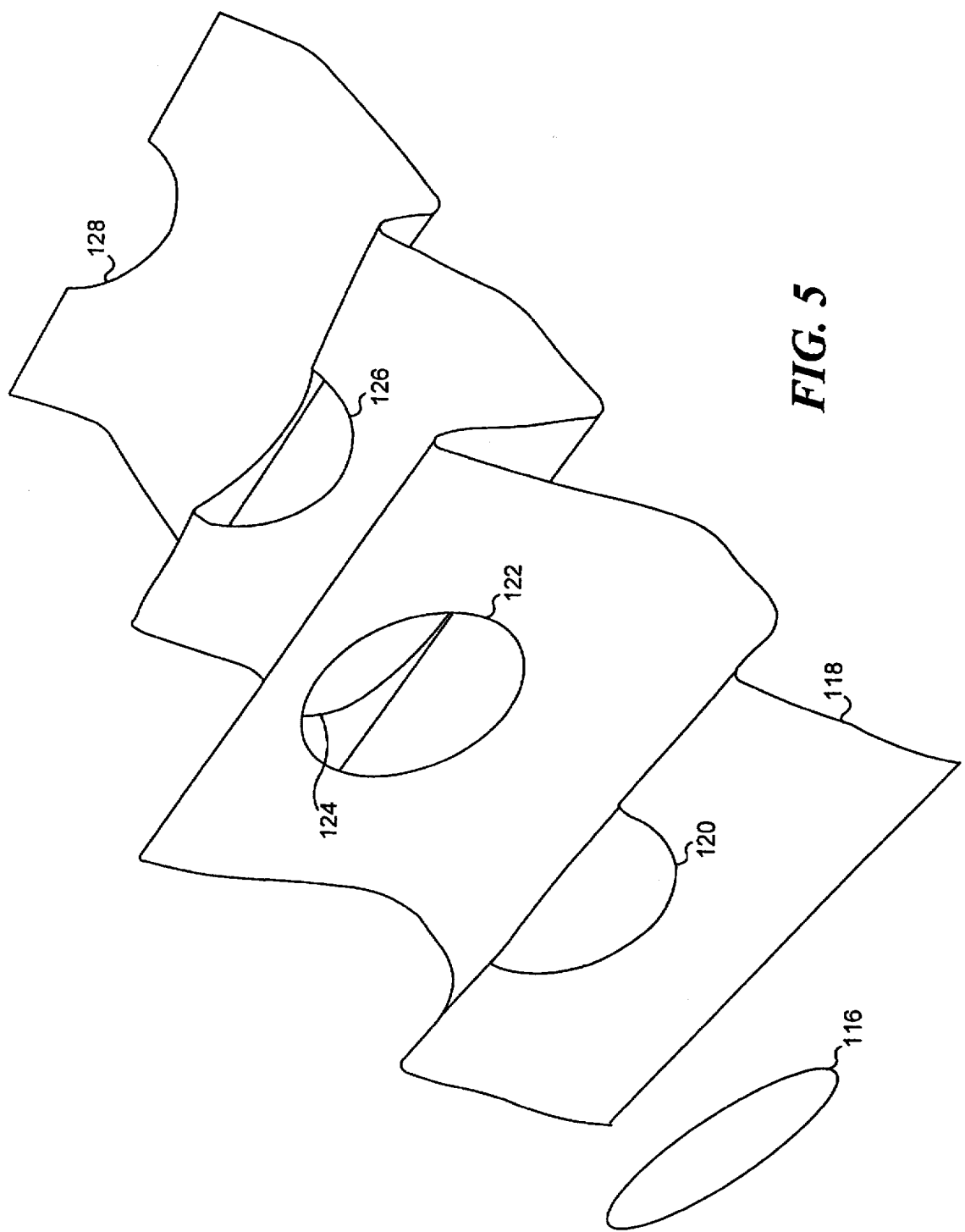
FIG. 5 is an isometric view of the trimmed NURBS surface of FIG. 4.

A trim region can comprise either a hole 112 or a boundary 114 on the surface, as shown in FIGS. 3B and 3C, respectively. Although the concept of projecting curves onto surfaces is known, the manner in which a curve is adaptively projected in interactive time in accord with the present invention is not known. The method is generalized to handle more complex projections where a projected curve 116 intersects a NURBS surface 118 in more than one location, as illustrated by the exemplary wire frame graphic of FIG. 4 and its corresponding isometric 3D image in FIG. 5. FIG. 5 clearly shows the trim regions that result from the projection of curve 116 onto NURBS surface 118, including boundary 128, and holes 120, 122, 126, and 124. The projection operation can be thought of as extruding the source 3D curve in the projection direction and then determining where the surface and the extruded object intersect to define the trim regions as a locus of points where the intersection(s) occur(s).

Figure 6:
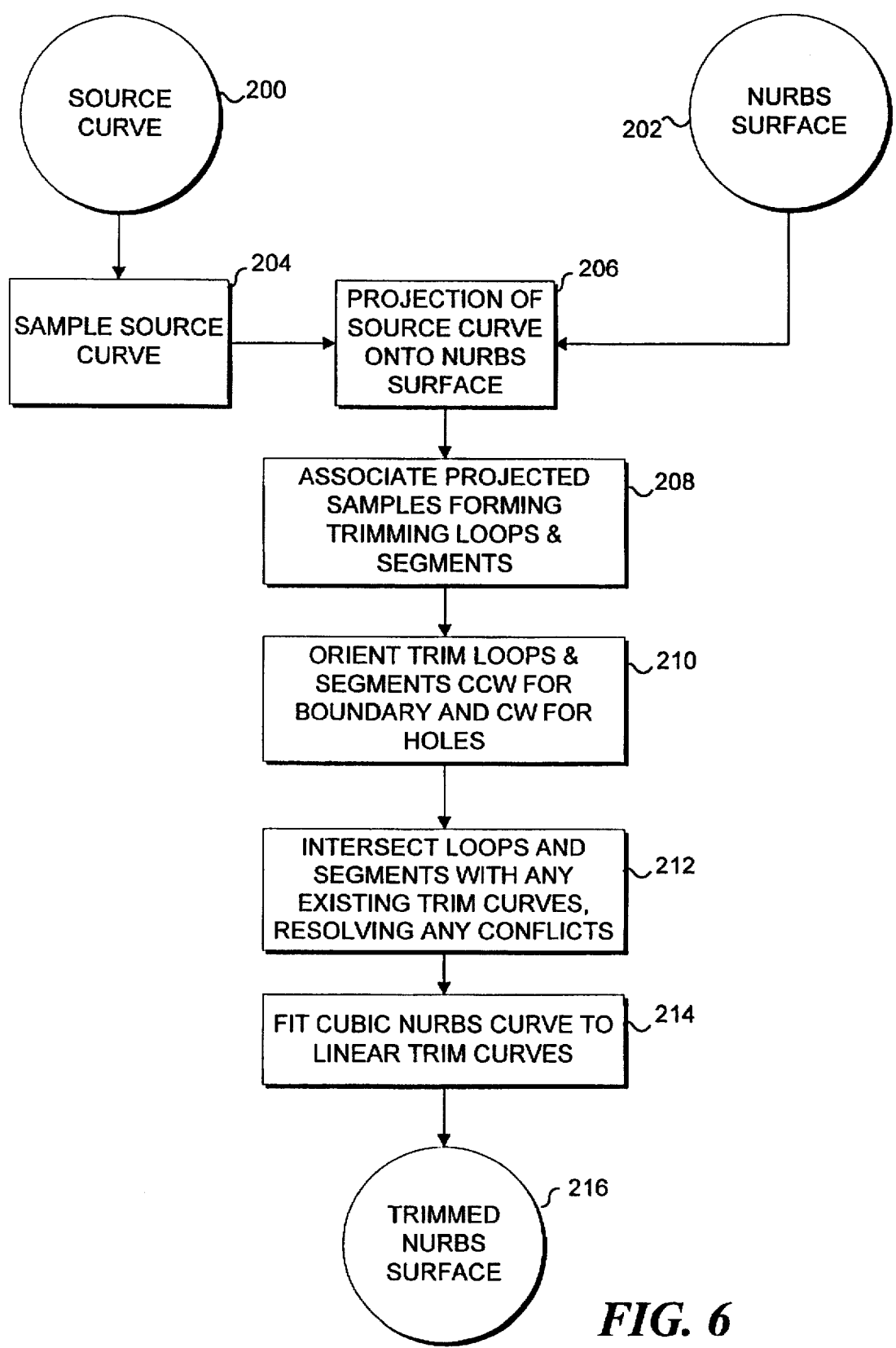
FIG. 6 is an overview flow chart illustrating the basic steps in trimming a NURBS surface in accord with the present invention.

The present method uses a discrete sampling of the source curve, and casts rays from each sample point, towards the target surface. A flow chart depicting the steps for the entire trimming process for NURBS surfaces is illustrated in FIG. 6. Although there are many details involved in trimming a NURBS surface, the basic steps of the process are shown in this Figure. The source curve is represented by a block 200 and the NURBS surface by a block 202. The algorithm takes as its input all of the rays projected from the source curve, each of which corresponds to one of the samples on the source curve. Each ray contains data defining all of its intersections with the target NURBS surface. Given this information about the intersections of all of the rays, in one pass, the algorithm is able to define the trim regions on the target surface, inserting information into the sampling where needed to define critical transitions on the NURBS surface.

The process begins as indicated in a block 204, by taking sample points along the source curve and intersecting a ray cast in a specified direction, from each sample point, through the NURBS surface (although not every ray may intersect this surface), as provided in a block 206.

To efficiently intersect a ray with a NURBS surface, a bounding box hierarchy is defined that is based upon the NURBS surface and which helps to efficiently reject rays that do not intersect the surface. The steps implemented are shown in the flow chart of FIG. 16. From a box 220, the steps for determining an intersection proceeds to a box 222, which provides for building a bounding box hierarchy for the NURBS surface. This aspect of the method begins with converting the NURBS surface into a series of individual adjacent Bezier patches defined over each predetermined interval of the NURBS domain. The Bezier patches are then grouped, taking four at a time, and a bounding box is created for each group of four patches. The grouping process is repeated at a second level, taking four of the original groups and providing them with a bounding box to make each group of the second level. This process is repeated for successive levels, with the number of groups being created decreasing, until only a single group within a bounding box at the highest level remains, and the bounding box for the highest level in the hierarchy of groups is the bounding box for the entire NURBS surface. A box 224 indicates that the procedure identifies the highest level or root of the hierarchy.

A box 226 indicates that the next step is to investigate the intersection of a ray with the bounding box at the current level (i.e., if the ray in fact intersects any bounding box). When a ray is projected from the curve, the procedure checks as indicated in a decision block 228, to determine if the ray intersects the current bounding box. Initially, this check is made for the bounding box at the root level of the hierarchy, i.e., it determines whether the ray intersects any part of the NURBS surface. If not, that ray need not be further processed; a ray that does not intersect the bounding box at the root level, which surrounds the entire NURBS surface, cannot intersect any Bezier patch on the NURBS surface. However, if an intersection of the ray with the bounding box at the root level of the hierarchy is detected, the logic proceeds to a decision block 230, which determines if the hierarchy has been traversed to a leaf node (lowest level), and if not, a block 232 descends to the next level down in the hierarchy. The logic then proceeds back to block 226, which determines if the ray intersects with a bounding box at the next lower level in the hierarchy. If no intersection exists in response to the inquiry in decision block 228, the logic proceeds to a block 236, which provides for advancing to the next bounding box on the current level. A decision block 238 determines if there are more nodes on the current level, and if so, the logic returns to block 226. If there are no more nodes on the current level, the logic proceeds to a block 240, which indicates that there are no intersections for this ray. The logic then proceeds to a decision block 242, which checks if there are any more rays to process. If not, the logic concludes in a block 246. If there are additional rays, the logic repeats, starting at block 224.

For a ray that is found to intersect a bounding box at a given level, the logic in this flow chart determines the bounding box of groups at the next lower level that is intersected by the ray. When a bounding box for a group is intersected by the ray, the procedure begins checking the lower level bounding boxes within that group. This process continues until a "leaf" of the hierarchy is reached at decision block 230, in which the ray is found to intersect a Bezier patch in one of the initial or lowest level groups, i.e., the process has reached the lowest level of the hierarchy. At that point, the process does a ray/NURBS surface intersection determination in a block 234, to provide the interception data that is subsequently used in the process for trimming the NURBS surface. Thereafter, the logic continues with decision block 238.

Figure 7A:
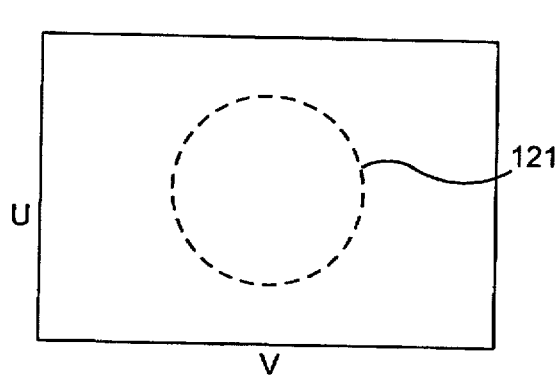
FIG. 7A illustrates an example of a projection forming a closed loop.
Figure 7B:
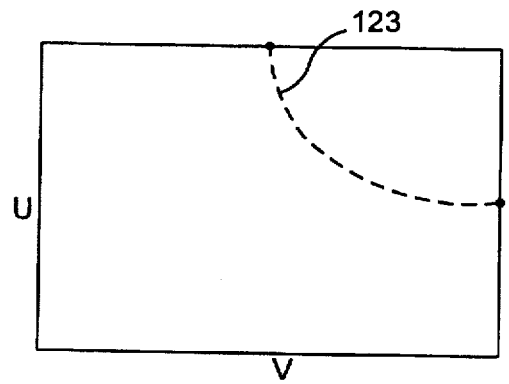
FIG. 7B illustrates an example of a projection forming a segment.

The above procedure yields a list of sample rays that have been intersected with the NURBS surface. Each ray may contain O to N intersections defined in a U,V domain mapping of the NURBS surface. The intersections of selected rays are linked together to define the trim regions, in accord with a block 208 of FIG. 6, as described below. In this step of the trimming process, all intersections of all rays are linked to their appropriate adjacent mates to form curve segments or boundaries, and closed loops in the U,V domain of the NURBS surface, as shown for a closed loop 121 and a boundary or curve segment 123 in the example illustrated in FIG. 7.

Figure 8:
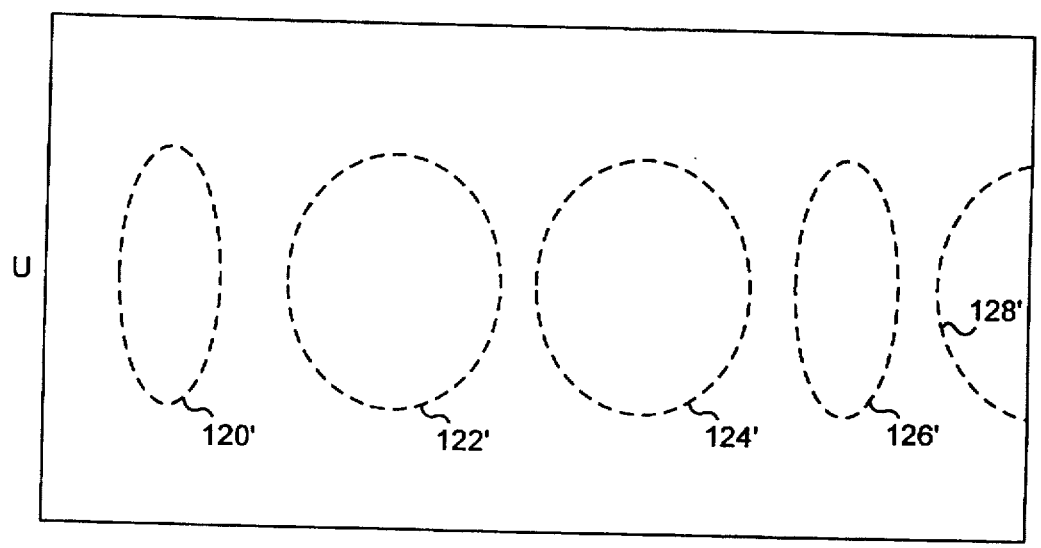
FIG. 8 illustrates the projection of the curve onto the NURBS surface, in the U,V domain, for the surface shown in FIG. 4.

The mapping of the intersections of the rays projected from projected curve 116 with NURBS surface 118 (FIGS. 4 and 5) into the U,V domain is illustrated in FIG. 8. In this Figure, reference numbers having a prime designate the corresponding mapping of the trim regions into the U,V domain. For example, trim holes 122 and 124 on NURBS surface 118 in FIG. 5 map to corresponding closed curves 122' and 124' in FIG. 8.

These curve segments and loops in the U,V domain are the basis for building the actual curves that define the trim regions on the NURBS surface. The challenge is to be able to efficiently connect the appropriate intersections even when rays cross surface boundaries, or rays enter or leave the NURBS surface. These transitions into or out of the NURBS surface topologically define how the projected curve will exist on the surface (i.e., the source curve can generate many different curves on the target NURBS surface).

The connection algorithm provides for visiting each ray once, and connecting its intersections of the NURBS surface with the intersections of the neighboring ray. In this context, a ray's corresponding neighboring intersection is defined as the intersection of the surface by the next ray projected from the next adjacent sample point along the source curve. This approach allows all intersections of all rays with the NURBS surface to be processed in one pass through the rays.

The method determines the intersections that are connected by examining the number of intersections of neighboring rays with the NURBS surface. Due to the spatial coherence of the rays and the continuity of the surface, decisions are made about how to connect intersections from one ray to the next as each pair of rays is processed. One ray and its neighbor either have the same number of intersections with the NURBS surface or not. When the number of intersections differs between adjacent rays, the method determines that a transition has occurred.

Figure 9:
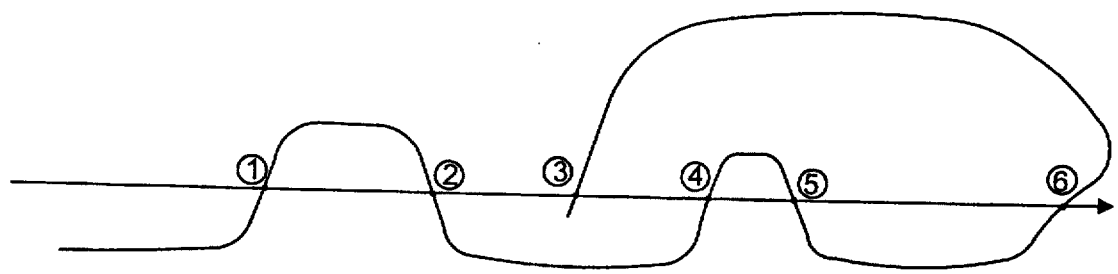
FIG. 9 illustrates a single projected ray and its intersections, in the U,V domain.

For efficient processing of the intersections, the connection algorithm assumes that the rays and their intersections have some type of ordering. The ordering comprises a list of rays in the order that they are projected from the curve, with each ray being associated with a list of its intersections with the NURBS surface. Intersections are ordered along a given ray by their parametric value, as shown by the example for the ray illustrated in FIG. 9. (Note that the NURBS surface intersected by the ray in FIG. 9 is not the same surface as shown in FIGS. 4 and 5.) In this example, intersection 3 appears at the end of the domain, which is disposed between intersections 2 and 4 on different parts of the surface.

The following paragraphs describe the actual linking process between neighboring rays for three different conditions. These steps are illustrated in the flow chart of FIG. 17, beginning at a start block 250. In a block 252, the intersections with the NURBS surface on two neighboring rays, curRay and nextRay, are ordered, based on the parametric values of the intersections. The three different conditions related to the relative number of transitions experienced by curRay and nextRay are discussed separately, as follows.

Case Where There Are No Transitions

This section discloses how the case where there are no transitions between two neighboring rays (i.e., when the neighboring rays have the same number of intersections) are handled. A decision block 254 in FIG. 17 determines if the number of intersections for curRay and nextRay are equal. If so, links are made to corresponding intersections on each ray, proceeding along each ray from the curve that is the source of the projected ray, as indicated in a block 256. The term "corresponding" means that intersection "one" on ray 1 corresponds to intersection "one" on ray 2. A parity argument is used to determine the direction to link corresponding intersections. Parity is toggled for each pair of corresponding intersections.

Figure 10A:
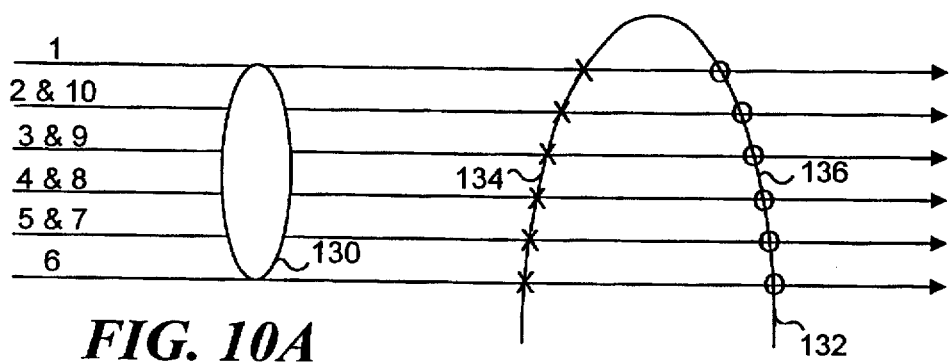
FIG. 10A illustrates a plurality of rays projected from a circle onto a NURBS surface in which there are no transitions.
Figure 10B:
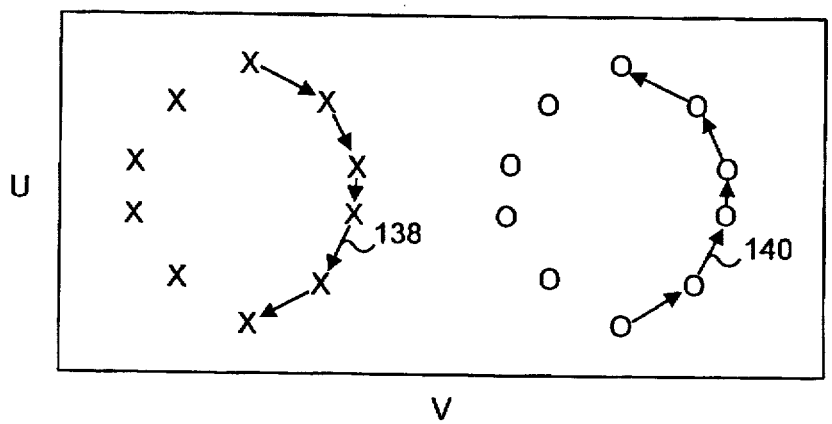
FIG. 10B illustrates the intersections of the rays in FIG. 10A in the U,V domain, indicating the toggling of parity of the rays.

In FIG. 10A, a circle 130 is projected onto a NURBS surface 132 using rays numbered 1 through 10, which pass through sample points that are spaced around the circle. The processing of the sample points proceeds around the circle in a clockwise direction. The first intersections with NURBS surface 132 along each ray are marked with an "X" and the next intersections with the NURBS surface are marked with an "O". These intersections are mapped into the U,V domain in FIG. 10B. Two neighboring rays called curRay and nextRay, are connected based on parity. When the parity of a ray is "on" (i.e., set), intersections curRay are linked before corresponding intersections on nextRay, and when the parity of a ray is "off," intersections on curRay are linked after corresponding intersections on nextRay.

A decision block 258 in FIG. 17 determines if there are more rays to process, and if not, a block 260 terminates the linking process. If additional rays remain to be processed, a block 262 increments curRay and nextRay and loops back to block 252. After processing all of the rays shown in the example illustrated in FIG. 10A, two closed curves 138 and 140 in the domain of the surface are defined by the linking process. The curves lie on a front face 134 and a back face 136 of a "hill" 132 comprising the NURBS surface, in the above example. These two curves are then used to trim the surface. It will be apparent that each ray intersects the NURBS surface twice, so that there are no transitions between the two neighboring rays.

Parity does not have much significance in the situation where there are no transitions between neighboring rays, but it becomes more important when there are transitions. Application of the parity will allow linking of two independent curve segments that are being built, without having to reverse the order of one of the lists of intersections associated with the rays. Other uses of the parity parameter will be apparent in the following sections.

Case Where There Are Transitions

This section discloses details for linking intersections between rays when a transition occurs. A transition is detected when the number of intersections of two adjacent rays with the NURBS surface differs. Where there is one or more transitions between adjacent rays, something has changed in the topology of the NURBS surface along the paths of the rays. This change in surface topology could be due to the crossing of a boundary of the surface, entering or leaving the NURBS surface, or reaching a point where a ray intersects more or less of the NURBS surface than its neighboring ray. Examples of the various types of transitions are shown in FIGS. 11A, 11B, and 11C. In FIG. 11A, a curRay 142 experiences zero intersections with a NURBS surface 146, but a nextRay 144 experiences two intersections because of the transition between the two rays occurring where ray 144 enters NURBS surface 146. In FIG. 11B, a curRay 148 intersects a NURBS surface 150 twice, while an adjacent nextRay 152 does not intersect the NURBS surface, because of the transition between the two rays that results from leaving the NURBS surface. In FIG. 11C, a curRay 154 intersects three different portions of a NURBS surface 156 a total of six times, while an adjacent nextRay 158 only intersects one portion of the NURBS surface twice.

Binary Subdivisions

Once a transition is found between two neighboring rays, curRay and nextRay, a recursive binary subdivision is performed to more accurately determine where on the NURBS surface that the transition occurred (to within some selected or predefined tolerance). The procedure subdivides the interval between curRay and nextRay, as provided in a block 264 of FIG. 17, to ensure that information about the transition of the surface between the two rays is not overlooked. The method is adaptive because it has the potential to create new sample rays if a ray discovers new information about the NURBS surface during the subdivision process. In this manner, given a minimal amount of data, the algorithm can still determine the correct topology of the curves on the NURBS surface.

To adaptively subdivide the interval between two rays, the parametric values on the source curve (from which curRay and nextRay originated) are split, i.e., the interval between the sample points from which the two rays originate on the source curve is divided by two to determine a new 3D sample point. A new ray, i.e., newRay 159 passing though this 3D point is then cast in the projection direction, as shown in FIG. 12A.

When newRay 159 has the same number of intersections as curRay 148, it is saved as a temporary ray called lowerRay, which is identified by reference numeral 160 in FIG. 12B. If the new ray has the same number of intersections as nextRay, it is saved as a temporary ray called upperRay, identified by reference numeral 162 in the Figure. The subdivision process continues between lowerRay and upperRay, each time potentially redefining lowerRay or upperRay and advancing closer to the actual transition point on the NURBS surface. Successively projecting a new lowerRay and a new upperRay thus hones in on the transition point, within the selected or predefined tolerance (see below).

If at any time in the subdivision process, the number of intersections on a subdividing ray is not the same as lowerRay or upperRay, the subdividing ray has discovered more surface detail about the NURBS surface than was revealed by the previous sampling. To avoid losing information about the surface, this subdividing ray is added to the list of sampling rays after curRay. The binary subdivision process continues between curRay and this new ray, which is now nextRay, as shown in FIG. 12C. NextRay will be processed in the next iteration of the loop. In FIG. 12C, a curRay 166 intersects a NURBS surface 164 four times, and a nextRay 168 intersects the surface only two times. However, a newRay 170 that subdivides the region between curRay 166 and nextRay 168 intersects the NURBS surface six times. Thus, the region between curRay 166 and newRay 170 will now be subdivided to determine where the transition on the NURBS surface lies. Once this determination is made (within the tolerance), the subdivision process will then similarly determine more accurately the transition location between newRay 170 and nextRay 168.

Boundary Crossings

At this point in the connection process, decisions are made as to what intersections cross boundaries. This information is needed to decide how to connect the intersections in the final stage of the process. If a transition crosses a closed boundary, it terminates at that spot, and no further connections from it are made. A block 266 in FIG. 17 provides for marking the boundary crossing on curRay and nextRay.

Assuming the binary subdivision process is completed as discussed above, lowerRay and upperRay are used to determine the intersections on curRay and nextRay that cross the surface boundary. The subdivision process guarantees that: (1) lowerRay and upperRay are within the tolerance of the transition; (2) lowerRay has the same number of intersections as curRay; (3) upperRay has the same number of intersections as nextRay; and, (4) an intersection on either upperRay or lowerRay that is within tolerance of an open boundary will cross the boundary. This result is assured because them cannot be more intersections between curRay and nextRay, which am closer to the boundary than occur on upperRay and lowerRay, or the subdivision process would have found them. The boundary crossing information is kept with the intersection data and is used in the final stage of the linking process.

Linking Intersections

After the completion of the binary subdivision and marking of boundary crossing intersections, intersections are linked on curRay and nextRay using information from lowerRay and upperRay as a guide. The connection process makes decisions on how to connect the corresponding intersections based on whether there are more or less intersections on curRay than nextRay, as indicated in a decision block 268 in FIG. 17. The following discussion is based on the assumption that the rays named curRay, nextRay, lowerRay, and upperRay are as defined by the subdivision process described above.

Number of Intersections on CurRay Greater than on NextRay

In the following example illustrated in FIG. 13, them are more intersections on a curRay 182 than a nextRay 184. The linking procedure is as follows. For each intersection on an upperRay 186, the algorithm finds the closest intersections on a lowerRay 188 based on the 3D distance between the intersections. These intersections pairs are indicated within the dash-line ellipses shown in FIG. 13. Once the method finds these intersection pairs, it links their corresponding intersections on curRay 182 and nextRay 184, as indicated by the curved arrows in the Figure, in accord with the step recited in a block 274 in FIG. 17. There is always an intersection on lowerRay 188 corresponding to one on curRay 182 and an intersection on upperRay 186 corresponding to one on nextRay 184, because the binary subdivision step guarantees that lowerRay 188 has the same number of intersections as curRay 182, and that upperRay 186 has the same number of intersections as nextRay 184.

As the procedure links intersections between curRay and nextRay, it uses a parity argument to determine in which direction to link the intersections. FIG. 13 shows step one in processing curRay 182, and, along with FIG. 14, these Figures can be viewed as snapshots in the linking process. It should be noted that in a previous iteration of the algorithm, curRay 182 was considered a nextRay. Consequently, samples on curRay may already have some interconnections to other samples not shown in this simplified example.

Once connections have been made to all intersections on nextRay 184, there may be some remaining unconnected intersections on curRay 182, as shown in FIG. 13. CurRay's intersections are examined and checked for a connection with respect to parity. If an intersection is found that is unconnected and does not cross an open boundary, it is connected to the next intersection along curRay, as indicated by the dash-line arrows in FIG. 14. This step is recited in a block 276 in FIG. 17. In this situation, the ray is leaving part of the surface, and individual segments on each side of the hill must be joined, as shown between upperRay 186 and lowerRay 188 in the example illustrated in FIG. 14.

To better understand what is happening when links are made across curRay, an examination of the surface domain provides insight. Assume that a "hill" in FIG. 15A is a 3D object and has depth. Rays 1 through 10 are projected from a source curve 192 toward hill 190, and rays 2 through 10 intersect hill 190. As the processing proceeds from ray to ray, linking intersections on non-transition rays, individual curve segments begin to form (denoted by arrows 194 connecting the X's and arrows 196 connecting the O's in the U,V domain for the intersections shown in FIG. 15B). When a ray containing a transition is reached (ray 2 or 10 in FIG. 15A) connections are made between points of intersection along the same ray. First a ray enters the top of the hill (e.g., ray 2), thereby connecting one end of the two individual segments being separately stitched together. This connection creates one segment with two open ends. Later, when the intersections of ray 10 with the NURBS surface are processed, the two open ends of the curve segment at the successive points of intersection of ray 10 with the surface are connected together, as denoted by dash-line arrows 198 in FIG. 15B. The result is a single, continuous closed curve.

The goal of the connections between transition rays is to stitch together the individual curve segments as shown in FIG. 15B. Once all rays have been processed, all curve segments will have been joined for a series of closed loops in the domain—except those that cross an open boundary, which will remain open segments.

CurRay Having Fewer Intersections Than NextRay

A similar series of steps is executed for linking intersections between curRay and nextRay, when nextRay has more intersections than curRay. The same correspondence between intersections on curRay and nextRay is established, and links are made between them, respecting parity. All intersections on curRay are thus connected, in accord with a block 270, potentially leaving some unconnected intersections on nextRay. The remaining unconnected intersections on nextRay are connected to the following unconnected intersections on nextRay, if a boundary is not crossed. As above, when curRay was traversed, all remaining intersections found were connected to the next available intersection on curRay. The same process is done to nextRay when curRay contains less intersections than nextRay. Following block 272 or 276, the procedure continues with decision block 258 and if any rays remain, increments curRay and nextRay, before repeating the procedure with the next ray.

After all loops and segments have been identified to define the trim regions, they must be oriented so that the boundaries are directed counter-clockwise and the holes are directed clockwise, as provided in a block 210 of FIG. 6. This process, which is disclosed in the flow chart of FIG. 18, begins with a start block 280. The first step shown in a block 282 is accomplished by identifying a new sample point near a randomly selected sample point on the curve. A block 283 indicates that the procedure determines if the new point lies interior or exterior to the curve. Next, in a block 284, a cross product is determined using the new sample point, the randomly selected sample point, and the next or adjacent sample point relative to the randomly selected sample point. The cross product of two intersecting vectors (e.g., in an x, y plane) returns an orthogonal vector (e.g., in the z direction). A nominal vector extending from the new sample point to the randomly selected sample point and another nominal vector extending from the new sample point to the next sample point are constructed for the next step (but need not be shown). Since the selected point is known to be either inside or outside the curve in the U,V domain, the sign (direction) of the orthogonal vector resulting from the cross product of these two nominal vectors determines the orientation of the curve. A decision block 286 determines if the sign of the cross product is correct for the required orientation. The orientation of the curve is reversed in a block 288, if the curve is found to be oriented improperly. The orientation check concludes in a block 290.

Curve Intersection

After the curves defining the trim regions have been oriented, any overlap between these curves and any previously existing curves must be resolved as indicated in a block 212 in FIG. 6. Finally, in a block 214, the curve segments are fit with a high degree NURBS curve (at least order three), yielding the trimmed NURBS surface, as represented by a block 216 in FIG. 6. Details of the procedure for resolving any conflicts between intersecting loops and segments of curves is shown in the flow chart of FIG. 19, beginning at a start block 300.

To implement the resolution process efficiently, a bounding box hierarchy is built for each 2D curve on the NURBS surface, as indicated by a block 302 in FIG. 19. A bounding box hierarchy for a curve is based on a bounding box for the entire curve, containing a bounding box for each U,V monotone segments of the curves, which in turn contains a bounding box for each individual line segment. U,V monotone segments are segments of the curve in which any horizontal or vertical line passed through the curve does not intersect the curve more than once. They are used because the bounding box of these segments is tightly constrained to the actual curve shape. Starting at the lowest level, a bounding box is created for just one segment of each curve. At the next level of the hierarchy, a bounding box is created for each U,V monotone segment, and finally, a bounding box is created for the entire curve. The detection of any curve/curve intersections is accomplished by first checking the bounding boxes for both curves (initially, at the highest level), as provided in a decision block 304. If the highest (root) level bounding boxes for both curves do not intersect, the curves do not intersect, as indicated in a block 306. The procedure then terminates in a block 308. However, if the root level bounding boxes intersect, the procedure shifts to the next level, in a decision block 310, which checks if any U,V monotone segment bounding boxes for the two curves intersect. If not, a decision block 312 determines if there are more U,V monotone segments, and if so, moves to the next U,V monotone segment in a block 314. The logic then loops back to decision block 304. If no more U,V monotone segments remain to be processed, the logic determines that there are no intersections (block 306) and terminates in block 308. This process continues until it identifies two bounding boxes enclosing just curve segments that overlap in response to the inquiry of decision block 310. A decision block 316 determines if segment bounding boxes for the curves overlap, and if so, the procedure determines the actual intersection data for the two curves in a block 322. However, if no segment bounding boxes overlap, a decision block 318 determines if there are more segments to be processed. If so, the logic moves to the next segment in a block 320 and loops back to decision block 316. If there are no more segments, the procedure proceeds to decision block 312. Following block 322, the procedure loops back to decision block 318.

If a curve/curve intersection is found, the two curve segments involved are split at the intersection point, and data are kept for the point indicating the direction to follow when traversing the curve. The direction indicated is based on the orientation of the intersecting curves.

Conclusions

The method is designed to incrementally build individual curve segments and transitions into or out of the surface, serving to connect these segments. At the end of the process, remaining should be a series of closed curves in the domain, representing the projection of the curve onto the NURBS surface. If any open segments remain, their end points should be on an open boundary.

Performance

In the current preferred embodiment of the present invention, curves containing roughly 100+ samples can be projected onto NURBS surfaces containing 400+individual Bezier patches (a NURBS surface is converted to a set of individual Bezier patches for ray/surface intersections) and frame rates of 2–3 frames per second can be obtained, animating a curve moving across the surface while trimming the surface at each step. Note: these times include all steps in the trimming process (sampling, conversion to Bezier patches, ray/surface intersection, the connection process, and fitting the linear sample with cubic NURBS curves). If the same curve and surface are used, but the sampling on the original curve is decreased to ~10 samples, a similar rough approximation of the result can be achieved, but with frame rates of 5–6 frames/second. The results for these examples were obtained on a Netpower PC with a single high-speed processor and a graphics accelerator card, running under Microsoft's Windows NT™, version 3.51.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for defining a trim region on a three-dimensional representation of a surface, as a function of a curve, comprising the steps of:

(a) defining a plurality of spaced-apart sample points along the curve;

(b) projecting rays from the plurality of points generally in a direction toward the surface, so that at least some of the rays intersect the surface at points of intersection;

(c) mapping each of the points of intersection of the rays with the surface into a U,V parametric domain;

(d) determining a number of the points of intersection of each ray with the surface;

(e) if the number of the points of intersection of two adjacent rays with the surface are equal, connecting corresponding points of intersection of said adjacent rays on the surface, to define at least a portion of a trim region;

(f) if the number of the points of intersection of two adjacent rays with the surface are different, detecting a transition of the surface that is disposed between said adjacent rays, where said transition indicates a location where one of the adjacent rays enters or leaves the surface, thereby defining a remaining portion of the trim region; and (g) displaying the surface and trim regions on a display.

2. The method of claim 1, wherein the step of detecting a transition of the surface further comprises the step of determining a location of the transition to within a defined tolerance.

3. The method of claim 2, wherein a binary subdivision process is used to determine the location of the transition to within the defined tolerance, said binary subdivision process including the steps of projecting new rays successively from the curve that are disposed between the adjacent rays, so that an interval between the adjacent rays is subdivided into increasingly smaller intervals, until the location of the transition is determined to be within a subdivided interval that is within the defined tolerance.

4. The method of claim 1, further comprising the steps of:
   (a) dividing the surface into a plurality of adjacent patches;
   (b) creating a bounding box hierarchy of the surface in which a lowest level of the hierarchy comprises each individual patch, a predefined plurality of said patches being grouped to form a box on a next higher level of the hierarchy, and subsequent levels in the hierarchy being created by grouping a predefined number of the boxes on a current level of the hierarchy, until the grouping yields a single box that fully encompasses the surface on a highest level of the hierarchy;
   (c) determining that a ray projected from the curve intersects the surface if the ray intersects the box at the highest level of the hierarchy; and, if so,
   (d) determining a location for the intersection of the ray with the surface by checking the boxes in successively lower levels of the hierarchy for a box that is intersected, until a patch on the curve that is intersected is identified at the lowest level of the hierarchy.

5. The method of claim 1, wherein the steps of connecting the points of intersection on the surface comprise the steps of defining at least one of a closed loop and a segment.

6. The method of claim 1, further comprising the step of ordering the rays and the points of intersection of the rays with the surface along the rays as the rays are projected from the curve.

7. The method of claim 1, further comprising the step of determining a direction in which to connect the points of intersection of adjacent rays as a function of a parity parameter associated with the points of intersection, each successive point of intersection along a ray exhibiting a change in the parity parameter.

8. The method of claim 1, wherein at each transition, points of intersection on adjacent rays are selected for connection with each other based on a shortest three-dimensional distance between the points of intersection on adjacent successive rays, and for whichever of two adjacent rays that has a greater number of points than the other, further comprising the step of connecting each remaining unconnected point of intersection to a next unconnected point of intersection along said ray.

9. The method of claim 1, further comprising the step of fitting a polynomial function to the points of intersection that are connected together, said polynomial function defining the trim region with a smooth curve.

10. The method of claim 1, further comprising the step of resolving any overlaps between trim regions defined by the curve on the surface and those defined by another curve.

11. The method of claim 1, further comprising the steps of determining an orientation for a set of the connected points of intersection that represent one of two different types of curves, said two different types of curves including a hole and a boundary on the surface; and, reversing the orientation of the set of the connected points of intersection, if the orientation thereof differs from that predefined for the type of curve represented by the set of connected points of intersection.

12. A system for defining a trim region on a three-dimensional representation of a surface, as a function of a curve, comprising the steps of:
   (a) a memory for storing a plurality of machine instructions that define a software program;
   (b) a processor for executing the plurality of machine instructions, causing functions to be carried out by the system, said functions including:
      (i) defining a plurality of spaced-apart sample points along the curve;
      (ii) projecting rays from the plurality of points generally in a direction toward the surface, so that at least some of the rays intersect the surface at points of intersection;
      (iii) mapping each intersection of the surface by the rays into a U,V parametric domain;
      (iv) determining a number of the points of intersection of each ray with the surface;
      (v) if the number of the points of intersection of two adjacent rays with the surface are equal, connecting corresponding points of intersection of said adjacent rays on the surface, to define at least a portion of a trim region;
      (vi) if the number of the points of intersection of two adjacent rays with the surface are different, detecting a transition of the surface that is disposed between said adjacent rays, where said transition indicates a location where one of the adjacent rays enters or leaves the surface, thereby defining a remaining portion of the trim region; and
   (c) a display, said processor executing the plurality of machine instruction to cause the surface and the trim region to be visually represented on the display.

13. The system of claim 12, wherein the machine instructions cause the processor to determine a location for any transitions of the surface within a defined tolerance.

14. The system of claim 13, wherein the machine instructions cause the processor to use a binary subdivision process to determine the location of any transitions to within the defined tolerance, said binary subdivision process projecting new rays successively from the curve that are disposed between the adjacent rays, so that an interval between the adjacent rays is subdivided into increasingly smaller intervals until the location of any transitions are determined to be within a subdivided interval that is within the defined tolerance.

15. The system of claim 12, wherein the machine instructions cause the processor to:
   (a) divide the surface into a plurality of adjacent patches;
   (b) create a bounding box hierarchy of the surface in which a lowest level of the hierarchy comprises each individual patch, a predefined plurality of said patches being grouped by the processor to form a box on a next higher level of the hierarchy, and subsequent levels in the hierarchy being created by grouping a predefined number of the boxes on a current level of the hierarchy, until by repeating the process, the grouping yields a single box that fully encompasses the surface on a highest level of the hierarchy;
   (c) determine that a ray projected from the curve intersects the surface if the ray intersects the box at the highest level of the hierarchy; and, if so, (d) determine a location for the intersection of the ray with the surface by checking the boxes in successively lower levels of the hierarchy for a box that is intersected, until a patch on the curve that is intersected is identified at the lowest level of the hierarchy.

16. The system of claim 12, wherein the plurality of machine instructions further cause the processor to order the rays and the points of intersection of the rays with the surface along each ray as it is projected from the curve.

17. The system of claim 12, wherein the plurality of machine instructions further cause the processor to determine a direction in which to connect points of intersection of adjacent rays as a function of a parity parameter associated with each of the points of intersection, each successive point of intersection along a ray exhibiting a change in the parity parameter.

18. The system of claim 12, wherein the plurality of machine instructions further cause the processor to select points of intersection on adjacent rays at each transition for connection to each other based on a shortest three-dimensional distance between the points of intersection on adjacent successive rays that determine the location of the transition within the defined tolerance.

19. The system of claim 12, wherein the plurality of machine instructions further cause the processor to fit a polynomial function to the points of intersection that are connected together, said polynomial function defining the trim region as a smooth curve.

20. The system of claim 12, wherein the plurality of machine instructions further cause the processor to resolve any overlaps between trim regions defined by the curve on the surface and those defined by another curve on the surface.

21. The system of claim 12, wherein the plurality of machine instructions further cause the processor to determine an orientation for a set of the connected points of intersection that represent one of two different types of curves, said two different types of curves including a hole and a boundary on the surface and, to reverse the orientation of the set of the connected points of intersection, if the orientation thereof differs from that predefined for the type of curve represented by the set of connected points of intersection.

* * * * *